United States Patent [19]

Yokoyama et al.

[11] Patent Number: 4,784,870
[45] Date of Patent: Nov. 15, 1988

[54] PROCESS FOR PREPARING PASTE FOOD PRODUCT

[75] Inventors: Hitoshi Yokoyama; Morio Furui, both of Sennan; Katsuto Sahara, Sakai; Yukiya Iwanaga; Toshiaki Saito, both of Sennan, all of Japan

[73] Assignee: Fuji Oil Company, Ltd., Osaka, Japan

[21] Appl. No.: 581

[22] Filed: Jan. 2, 1987

Related U.S. Application Data

[63] Continuation-in-part of Ser. No. 714,089, Mar. 20, 1985, abandoned.

[30] Foreign Application Priority Data

Mar. 21, 1984 [JP] Japan ............................ 59-54760
Aug. 10, 1984 [JP] Japan ........................... 59-168564
Aug. 10, 1984 [JP] Japan ........................... 59-168565

[51] Int. Cl.[4] ............... A23L 1/317; A23L 1/314; A23C 19/09
[52] U.S. Cl. ........................... 426/573; 426/574; 426/249; 426/582
[58] Field of Search ........... 426/574, 92, 249, 641, 426/656, 657, 573, 582, 89, 643, 644, 646

[56] References Cited

U.S. PATENT DOCUMENTS

| | | | |
|---|---|---|---|
| 1,721,406 | 7/1929 | Parsons | 426/92 X |
| 2,774,314 | 12/1956 | Moser | 426/249 |
| 3,295,466 | 1/1967 | Bell et al. | 426/249 |
| 3,372,654 | 3/1968 | Bell | 426/249 |
| 3,615,690 | 10/1971 | Lisle et al. | 426/582 |
| 3,870,811 | 3/1975 | Schulz | 426/643 X |
| 4,032,669 | 6/1977 | Peters et al. | 426/582 X |
| 4,197,324 | 4/1980 | Ziminski et al. | 426/656 X |
| 4,206,239 | 6/1980 | Horner | 426/574 X |
| 4,524,081 | 6/1985 | Bansal | 426/249 |
| 4,552,774 | 11/1985 | Gronfor | 426/582 |

FOREIGN PATENT DOCUMENTS

| | | | |
|---|---|---|---|
| 572810 | 3/1959 | Canada | 426/574 |
| 2310084 | 12/1976 | France | 426/582 |
| 49-037266 | 7/1974 | Japan | 426/641 |
| 50-13348 | 5/1975 | Japan | 426/574 |
| 0039244 | 3/1984 | Japan | 426/582 |
| 1518778 | 7/1978 | United Kingdom | 426/643 |

Primary Examiner—Donald E. Czaja
Assistant Examiner—Helen Pratt
Attorney, Agent, or Firm—Wenderoth, Lind & Ponack

[57] ABSTRACT

A process for preparing a paste product which comprises mixing a heat gellable protein paste with an acidic paste in a low degree of homogeneity and heating to gelatinize the resulting mixture. A mixing-molding apparatus used for the preparation of the paste product is also disclosed.

9 Claims, 1 Drawing Sheet

PROCESS FOR PREPARING PASTE FOOD PRODUCT

This application is a continuation-in-part application of the application Ser. No. 714,089 filed Mar. 20, 1985 (now abandoned).

FIELD OF THE INVENTION

The present invention relates to a process for preparing a paste food product. More particularly, the product of the present invention is a novel livestock meat ham-like paste food having a heterogeneous cross section. The present invention also relates to an apparatus used in the preparation of the above product.

BACKGROUND OF THE INVENTION

Generally, in fish paste products such as kamaboko-type products which are typical and traditional Japanese fish paste products, both the starting materials and the final products have very homogeneous properties. Such properties are characterized by, for example, homogeneous cross sections and, in case of sliced products, tearing in almost linear rather than in zigzag fashion by application of a certain tensile force. In order to improve marketability, recently, there have been developed various paste products having heterogeneous properties, for example, kamabokos having patterns such as letters or figures appearing on their cross sections, chikuwas (which are one kind of kamaboko-type products having holes longitudinally extended through the centers thereof) with sticks of cheese or sausages inserted into these holes, and kamabokos with other solid edible ingredients such as cheese blocks scattered therein. However, these various marketed products having heterogeneous properties still have uniform patterns and artificial cross sections. Further, basically, these products still maintain the same homogeneous properties as those of the starting materials, i.e., semi-processed wet fish protein prepared from minced fish flesh, so-called, surimi.

In order to obtain a novel paste food product having heterogeneous properties which is completely different from the above products to further improve marketability of paste products, the present inventors have studied intensively. As the result, it has been found that the homogeneous properties of a paste product and its starting material such as surimi or minced meat can be modified by mixing an acidic paste with a protein-containing paste (hereinafter referred to as heat gellable protein paste) such as fish surimi in a low degree of homogeneity and heating the resulting mixture and that the product thus obtained is a livestock meat ham-like paste product having a heterogeneous cross section which tears in zigzag fashion when applying a tensile force. In addition, it has been found that the mixing of the acidic paste with the heat gellable protein paste and the molding of the product can be performed continuously, constantly, efficiently and sanitarily by using a static mixer which has not been hitherto used in the preparation of paste food products, particularly, mixing in a low degree of homogeneity.

OBJECTS OF THE INVENTION

One object of the present invention is to provide a process for a paste food product having improved heterogeneous properties.

Another object of the present invention is to provide an apparatus suitable for the process of the present invention.

These objects as well as other objects and advantages of the present invention will become apparent to those skilled in the art from the following description and the accompanying drawings.

SUMMARY OF THE INVENTION

Figure 1:
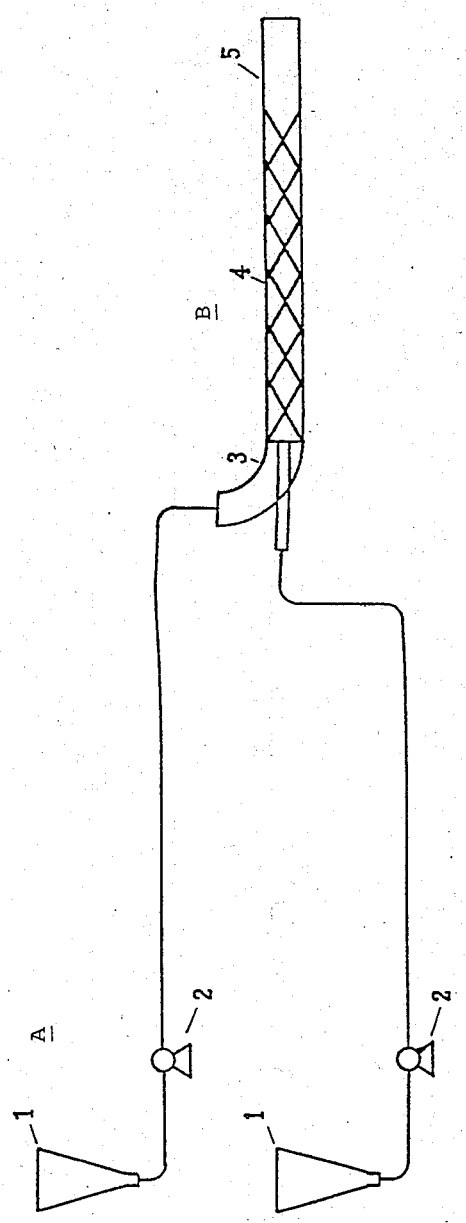
FIG. 1 is a schematic flow sheet of a preferred embodiment of the process of the present invention wherein a static mixing-molding apparatus is used.

According to the present invention, there is provided a process for preparing a paste food product which comprises mixing a heat gellable protein paste with an acidic paste in a low degree of homogeneity and heating the resulting mixture. The present invention also provides a mixing-molding apparatus for preparing the paste product which comprises a means for feeding plural paste materials under pressure in plural flows, and a tubular path connected to said means for feeding paste materials comprising a tubular introducing portion for combining the paste flows from said means, a tubular mixing portion connected to said introducing portion which contains static mixing elements therein, and a hollow tubular molding portion connected to said mixing portion. The product of the present invention is a novel paste product which differs from the abovementioned conventional fish paste products or other paste food products having homogeneous properties and contributes to increase demand for paste products requested in this field.

DETAILED DESCRIPTION OF THE INVENTION

Typically, the heat gellable protein paste used in the present invention is surimi (minced meat or flesh) or surimi-like paste which is known as a starting material for preparation of paste products such as kamaboko-type paste products, various sausages, vegetable protein pastes and the like. That is, the paste contains as a major ingredient minced animal meat, minced poultry meat, minced fish or shellfish meat and/or a vegetable protein paste generally having a neutral pH of 6.5 to 7.5 and, if necessary, as minor ingredients salt, starch, egg white, milk protein, fats and oils, seasonings, spices, flavoring agents, coloring agents, added water or the like. When the heat gellable protein paste is heated at a neutral pH range, it forms a paste product or a paste product-like gel having certain elastic properties. When it is heated under acidic conditions, it forms a relatively brittle gel or it is hardly gelatinized. In the present invention, the heat gellable protein paste is not limited to the above-mentioned surimi or surimi-like paste and it includes any paste-like material having the same gelation properties as those of surimi or surimi-like paste.

The suitable pH range for the term "acidic" as used herein, for example, "acidic paste", is 4 to 6.5, preferably 5.5 to 6.2, when using the heat gellable protein paste generally having a neutral pH of 6.5 to 7.5 (hereinafter sometimes merely referred to as "neutral paste") made from minced fish meat and soybean protein, although it varies depending upon a particular neutral paste used. Generally, by the term "acidic", it is intended to mean such a pH range that, by contacting with the acidic paste, the neutral paste partially forms a brittle or crisp texture, when it is gelatinized by heating, to provide heterogeneous properties to the final product. When there is little difference between pH of the acidic paste and that of the neutral paste with which it is to be contacted, modification of the neutral paste is hardly expected and homogeneous texture and mouth feel like kamaboko-type paste products still remain in the product obtained. On the other hand, when the pH of the acidic paste is too low, it causes difficulty in gathering of doughs and the shape retaining properties are liable to be degraded.

It is also desirable that the acidic paste shows a certain spreadability during the mixing procedure. When the consistency of the acidic paste is too low so that the paste is too readily homogenized with the neutral paste, modification is hardly expected and only a relatively brittle gel is formed. On the other hand, when the acidic paste is too hard to transform it by ordinary mixing procedure (i.e., the paste is hardly formed into a string), it is difficult to mix the acidic paste with the neutral paste such as surimi to provide good heterogeneous properties and modification by spreading of the acidic paste into a mass of the neutral paste to some extent can hardly be expected. According to the present inventors' experiment, it is suitable that the consistency of the acidic paste measured with "Rheometer" (an apparatus for measuring physical properties manufactured by FUDO KOGYO KK in Japan) is in the range of 400 to 10 g, preferably, 200 to 30 g. (The measurement has been performed by using a plunger having a face area of 0.785 cm$^2$ at the lifting rate of the supporting stand of 2 cm/min at the same temperature as that in a particular mixing operation. However, all data in the examples hereinafter were those measured at 5° C.)

In the preferred aspect of the present invention, an acidic paste containing a fat or oil is used. By incorporating a fat or oil, not only is the appearance of the product further improved due to its cross section having a clear fatty tissue-like pattern distributed therein, but also mouth feel is further improved due to enhancement of juiciness. Moreover, when the acidic paste contains a suitable amount of a fat or oil, such preferred tearing properties that the product can be readily torn along the contour of the acidic paste are clearly obtained. Such properties, coupled with such modification that the neutral paste can be torn in zigzag fashion, contribute to provide ham-like mouth feel and texture to the product. The amount of the fat or oil in the acidic paste is 5 to 50%, preferably, 10 to 40%. The melting point of the fat or oil used is not critical and either a liquid oil or a solid fat can be used.

In one embodiment of the acidic paste, it can be prepared by adjusting the pH of the above heat gellable protein paste generally having a neutral pH and, preferably, admixing with a fat or oil or a material containing a fat or oil such as margarine. When the heat gellable protein paste is heated under acidic conditions, mouth feel thereof becomes somewhat crumbly. However, when a fat or oil is added, the acidic paste shows improved mouth feel. To adjust the pH, in addition to a food grade acid, other known acidic materials, such as acidic casein, buttermilk, fruit juice and jam can be used. Alternatively, an acidic material such as lactic acid can be formed in the acidic paste by fermentation.

Further, a material having poor heat coagulation properties can be used alone as the acidic paste. That is, for example, soft cheese (The term "cheese" as used herein includes cheese, so-called filled cheese using various different fats, so-called imitation cheese using various different protein and fats, and the like. And the term "soft" as used herein is intended to mean that the consistency of cheese is within the above preferred range such as cream-like consistency.) or processed yogurt thickened with a thickening agent and the like can be used. Particularly, by using the above soft cheese, the product which is almost free from the typical fish or soybean protein flavor of conventional paste products and has good quality can be obtained. In addition, soft cheese can be readily made into a homogeneous paste with the other starting paste material without requiring melting thereof as in the case of hard cheese. In addition, even if the other starting paste material is minced fish flesh, surimi, or the like, wherein the treatment at a temperature above 10° C. should be avoided, there is no problem in using soft cheese. By the way, when the paste having poor heat coagulation properties is used alone as the acidic paste, syneresis may be observed at the acidic paste portion in the final product or the acidic paste portion may be cracked when the final product is sliced into thin pieces. These problems, however, can be solved by incorporating a heat gellable protein or the heat gellable protein paste into the acidic paste. In this case, the amount of the heat gellable protein paste is preferably 20% by weight or more based on the total weight of the acidic paste. Of course, the heat gellable protein paste per se to be incorporated into the acidic paste is not necessarily acidic, but, after admixing with the acidic paste, the entire paste should be within the above pH range.

Then, the above neutral heat gellable protein paste and the acidic paste are subjected to mixing at a low degree of homogeneity. Optionally, third materials such as meat blocks, meat-like protein materials and the like can be added to the mixture. In order to maintain physical properties of paste products by using the acidic paste, the mixture desirably contains 50% or more of the neutral heat gellable protein paste. On the other hand, in order to give heterogeneous properties by mixing the acidic paste, whole paste desirably contains 5% or more of the acidic paste. When the amount of the neutral paste is too small, shape retention of the product becomes poor and, when the amount of the acidic paste is too small, mouth feel of the product is homogeneous and modification of the paste texture is insufficient. The above acidic paste contributes to modification of the starting neutral paste per se at the portion thereof contacting the acidic paste to make the portion of the neutral paste heterogeneous and, as the result, a product shows improved ham-like properties.

The mixing of both pastes should be performed with preventing too much localization of either paste or homogenizing of both pastes. That is, the mixing is performed in such a degree that at least one sting of the acidic paste should be contained in a cross section of several cm$^2$ at any portion of the mixture, preferably, in such a degree that several spread acidic paste portions are found in a cross section of several cm$^2$, i.e., 4 to 9 cm$^2$ at almost all parts of the mixture. Such degree of mixing can be obtained by mixing with a manual operation or by mixing for a short period of time with an apparatus which has been used in the conventional preparation of paste products, such as a "raikaiki" (a kind of mortar), a silent cutter, a mixer or the like and can be visually monitored or experimentally determined. Particularly, by using a static mixer, the operation can be performed continuously, constantly, efficiently and sanitarily. A static mixer per se is well-known and comprises a tubular path and static mixing elements contained therein. Examples of the static mixer include Sulzer Mixer (Sulzer Brothers Ltd.), Hi-Mixer (Toray Ind. Inc.), Static Mixer (Kennix Co., Ltd.) and Static Mixer (Noritake Co., Ltd.). However, in the present invention, as distinct from other ordinary usage of the static mixer, the mixing operation is performed with preventing formation of a homogenizing state. That is, in order to obtain a homogenizing state, the deviation constant " /x" (ratio of x, which is the mean value of a noted variation of the mixture given by passing through the static mixer, to which is the standard deviation from the x) should be less than 0.05, whereas it is very rare that this deviation constant is less than 0.2 in the present invention. Therefore, generally, the number of static elements in the static mixer is small. Although the suitable number of the elements somewhat varies depending upon the flow rate of the pastes, the diameter of the tubes of the static mixer, the shape of the elements, the alternative arrangement of the elements and the like, about 2 to 15 is preferred. According to the above mixing procedure in a low degree of homogeneity, more natural and ham-like patterns can be readily obtained in comparison with artificial and uniform patterns of conventional paste products which are formed according to the shape of the orifice of a known kamaboko molding machine for multi-colored kamaboko.

By the way, when the size of the above third material is too large for treating with the elements, it can be mixed after treatment by the static mixer. But in that case, such mixing procedure should be carefully performed with preventing homogenizing of both pastes.

Then, the materials mixed in a low degree of homogeneity is heated to gelatinize at least the neutral paste portion thereof. In general, it is preferable to mold the mixture prior to or at the same time of the heating procedure, and so-called suwari treatment may be performed. The molding procedure includes stuffing of the mixture of pastes into casing or tray and, occasionally, freezing and slicing. Alternatively, the molding procedure can be also performed by a hollow tubular path attached to the tip portion of the static mixer adjacent to the elements.

Generally, heating of the mixture of pastes is performed at a temperature of 80° C. or higher and retort heating may be employed. Further, heating can be also performed by the hollow tubular path adjacent to the elements and, in this case, a casingless paste product is obtained.

The resulting product thus obtained is not a conventional kamaboko-type homogeneous product, but is a ham-like product having heterogeneous properties with a portion having fragile mouth feel. The sliced product thereof tears in zigzag fashion.

The above process of the present invention is preferably performed by using the mixing-molding apparatus of the present invention. As shown in the accompanying FIG. 1, the apparatus comprises a means A for feeding plural paste materials under pressure in plural flows, and a tubular path B connected to said means for feeding paste materials comprising a tubular introducing portion 3 for combining the paste flows from said means, a tubular mixing portion 4 connected to said introducing portion 3 which contains static mixing elements therein, and a hollow tubular molding portion 5 connected to said mixing portion 4.

The means A for feeding paste materials is usually composed of plural hoppers 1 and constant feeding pumps 2 such as mohono pump and comet pump. A conventional kamaboko molding machine for molding multi-colored kamaboko-type paste products which performs feed of plural paste materials under pressure in plural flows can be also used for this purpose.

As the tubular introducing portion 3 which combines the plural paste flows from the pump 2 in a single flow, there can be used concentrically arranged plural tubes such as concentrically arranged double tubes. An orifice portion of a conventional kamaboko molding machine for multi-colored kamaboko-type paste products can be also used as the tubular portion 3. Since, in the present invention, the mixing of the pastes is performed in a low degree of homogeneity, it is preferable to arrange the tubes in such a manner that the acidic paste is fed toward the axial center of the tubes to attain a suitable cross sectional distribution of the acidic paste.

Figure 2:
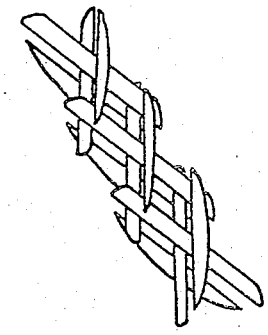
FIG. 2 is a schematic perspective view illustrating the shape and arrangement of one embodiment of static mixing elements used in the process of the present invention.

The mixing portion 4 containing static elements therein is the main portion of the static mixer, and the number and arrangement of the elements are as described above. A typical example of the shape and the arrangement of the elements are schematically shown in FIG. 2.

The hollow molding portion 5 has a cavity therein. When the apparatus does not include this portion, the mixture fed from the mixing portion 4 is liable to scatter. In addition, another molding operation is further required and it may be difficult to constantly obtain te product having a good cross sectional pattern. Generally, the length of the molding portion 5 should be more than twice as long as the inner diameter thereof. This molding portion 5 may be also used as a means for heating the mixture by providing a steam jacket or a high-frequency generator about the molding portion.

The tubular path B comprising the introducing portion 3, the mixing portion 4 and the molding portion 5 has the same inner diameter throughout its entire length, of the inner diameter thereof may gradually decrease toward the tip thereof. It should be noted that, if the inner wall of the tubular path is rough, three-dimensional mixing may be performed and the ham-like cross sectional layer structure may be destroyed.

The following examples further illustrate the present invention in detail but are not to be construed to limit the scope thereof.

EXAMPLE 1

80 Parts of minced pollack (SA grade), 20 parts of minced pollack (2nd grade) [SA grade means a special grade according to the standard defined by the Japanese Frozen Fish Meat Association which contains about 77% water. The 1st grade contains about 78% water and the 2nd grade contains about 79.5% water.], 8 parts of potato starch, 2 parts of egg white, 2.8 parts of salt, 40 parts of added water (for thinning), a small amount of seasoning, a red coloring agent and spices were mixed and to the mixture was added an emulsion consisting of 3 parts of isolated soybean protein flour, 0.5 part of soybean oil and 12 parts of water. (Hereinafter, this mixture is referred to as "Surimi A", pH 6.7.)

80 Parts of Surimi A was mixed with 20 parts of commercially available filled-type soft cheese (manfactured and sold by Fuji Oil Co., Ltd. under the trade name of "QUVARE S", pH 5.4, consistency 150 g) in a silent cutter for about 5 to 7 seconds to give a desired heterogeneous state wherein soft cheese was suitably extended in Surimi A. Then this mixture was stuffed in plastic casing of 55 mm wide and heated in the steamer at 88° C. to give a gelatinized product.

As reference examples, the same procedures were repeated except that either a relatively harder filled-type cheese (manufactured and sold by Fuji Oil Co., Ltd. under the trade name of "QUVARE D", pH 5.5, consistency 500 g) cut into small blocks (Reference A), or the soft cheese used in the above but adjusted to pH 6.5 with sodium carbonate (consistency: 80 g)(Reference B) was used instead of "QUVARE S" to obtain paste products.

In the product of Example 1, a fatty tissue-like pattern was found in its cross section and its lean meat-like portion showed good texture. When the product was sliced, the lean meat-like portion thereof tended to be torn in zigzag fashion as a meat ham. However, in the product of Reference A, most of the cheese blocks remained as they were and no modification of the pastes were observed. The product of Reference A was a kamaboko-like product containing cheese blocks just dotted therein. In the product of Reference B, the texture of the product remained homogeneous, although some fatty tissue-like pattern was observed in its cross section. Further, in Reference B, there remained a typical fish flavor, while the product of Example 1 did not have such flavor.

EXAMPLE 2

A surimi was prepared according to the same manner as Surimi A described in Example 1 except that the red coloring agent was not added (hereinafter referred to as "Surimi B"). To Surimi B thus obtained was added citric acid, or citric acid and margarine (oil content: 82%), and the mixture was mixed to obtain the acidic pastes No. 1 to No. 3 shown in the following Table, respectively. 20 Parts of each paste shown was separately ununiformly mixed with 80 parts of Surimi A by mixing in a silent cutter for a few seconds and worked up in the same manner as described in Example 1 to obtain the paste product.

| No. | pH | Ratio of Margarine Added to Paste (wt %) |
|---|---|---|
| 1 | 4.0 | 15 |
| 2 | 5.5 | 0 |
| 3 | 5.5 | 15 |

Although the product from the pastes Nos. 1 and 2 had ham-like, lean meat-like portions, they are inferior to that of No. 3 because the texture of the product No. 1 was crumbly and the fatty tissue-like pattern of the product No. 2 was unclear.

EXAMPLE 3

A paste product was prepared in the same manner as described in Example 2 according to the same formulation as the product No. 3 except that 25 parts of a corned-beef-type meat analog (sold by Fuji Oil Co., Ltd. under the trade name of "SOYEES") was further added to give a ham-like product having a corned beef flavor.

EXAMPLE 4

An emulsion paste consisting of 10 parts of isolated soybean protein flour, 30 parts of soybean oil and 40 parts of water was mixed with a chicken paste and soybean protein fiber (sold by Fuji Purina Protein Co., Ltd. under the trade name of "FUJI PURE SP-MM") in the ratio of 5:1:1. The mixture was treated in a silent cutter for 3 minutes. Then, according to the same manner as in Example 1 except that the resulting mixture was mixed with the commercially available filled-type soft cheese instead of Surimi A, the paste product was prepared. The product thus obtained was a ham-like product having good properties.

EXAMPLE 5

Acidic pastes were prepared by homogenizing the above Surimi B and commercially available filled-type soft cheese in the following ratios.

| No. | Content of Surimi B Acidic Paste (%) | pH of Paste |
|---|---|---|
| 1 | 0 | 5.4 |
| 2 | 10 | 5.45 |
| 3 | 30 | 5.7 |
| 4 | 40 | 6.0 |

80 Parts of Surimi B was ununiformly mixed with 20 parts of the acidic paste in a silent cutter for 5 to 7 seconds and then the resulting mixture was stuffed in plastic casing of 55 mm wide and heated in a steamer at 88° C. to give a gelatinized product. Each product had a fatty tissue-like pattern found in its cross section and, when it was sliced, the lean meat-like portion thereof was torn in zigzag fashion like ham. However, when the product was continually sliced, the product showed different properties from each other. For example, when the acidic paste contained only 10% or less of Surimi B, upon slicing, the product showed crack of its fatty tissue-like portion and a little syneresis.

EXAMPLE 6

By using the apparatus shown in FIG. 1 (inner diameter of the mixing portion 4: 25.4 mm; static elements: type SMXL produced by Sulzer Brothers Ltd. as shown in FIG. 2, the number thereof being 7), Surimi A and the acidic paste No. 3 in Example 5 were mixed at a weight feed ratio of 8:2 and at a total feed flow rate 300 kg/hr, and stuffed in casing (55 mm wide) at the exit of the molding portion 5. According to this procedure, molding and mixing in a desired low degree of homogeneity can be attained continuously, constantly, efficiently and sanitarily. The stuffed product was heated in a steamer maintained at the temperature of 88° C. for 40 minutes to give the desired gelatinized product.

This product resembled ham meat in that it had a fatty tissue-like texture found in its cross section and a lean meat-like portion had good texture. When the product was sliced, it could be torn in zigzag fashion.

What is claimed is:

1. A process for preparing a paste product which comprises mixing a heat gellable protein-containing paste with an acidic paste in a low degree of homogeneity and heating to gelatinize the resulting mixture; the heat gellable protein-containing paste having a pH in the range of from 6.5 to 7.5 and being selected from the group consisting of animal meat paste, poultry meat paste, fish meat paste, shellfish meat paste, vegetable protein paste and a mixture thereof and the content thereof being not less than 50% by weight based on the total weight of the mixture; the pH of the acidic paste being at least 4 but less than 6.5 and the content thereof being not less than 5% by weight based on the total weight of the mixture; and the low degree of homogeneity being such that the cross section of 4 to 9 cm$^2$ at any portion of the mixture contains at least one string of said acidic paste.

2. A process according to the claim 1, wherein the heat gellable protein-containing paste further contains an ingredient selected from the group consisting of salt, starch, egg white, milk protein, seasonings, flavoring agent, coloring agent, added water and a mixture thereof.

3. A process according to claim 1, wherein the pH of the acidic paste is in the range of from 5.5 to 6.2.

4. A process according to claim 1, wherein the acidic paste contains a fat or oil.

5. A process according to claim 4, wherein the content of the fat or oil in the acidic paste is in the range of from 5 to 50% by weight.

6. A process according to claim 5, wherein the acidic paste is soft cheese.

7. A process according to claim 1, wherein the acidic paste further contains a protein paste selected from the group consisting of animal meat paste, poultry meat paste, fish meat paste, shellfish meat paste, vegetable protein paste and a mixture thereof.

8. A process according to claim 7, wherein the acidic paste is a homogeneous mixture of soft cheeses and the protein paste.

9. A process according to claim 8, wherein the content of the protein paste is 20% by weight or more based on the total weight of the acidic paste.

* * * * *